United States Patent
Shin

(10) Patent No.: US 9,333,990 B2
(45) Date of Patent: May 10, 2016

(54) CONNECTION STRUCTURE OF COWL AND FRONT PILLAR

(71) Applicant: Hyundai Motor Company, Seoul (KR)

(72) Inventor: Seongsu Shin, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/487,953

(22) Filed: Sep. 16, 2014

(65) Prior Publication Data

US 2015/0291223 A1    Oct. 15, 2015

(30) Foreign Application Priority Data

Apr. 14, 2014    (KR) .................. 10-2014-0044422

(51) Int. Cl.
| | | |
|---|---|---|
| *B62D 25/08* | (2006.01) | |
| *B62D 27/02* | (2006.01) | |
| *B62D 25/04* | (2006.01) | |

(52) U.S. Cl.
CPC .............. *B62D 27/023* (2013.01); *B62D 25/04* (2013.01); *B62D 25/081* (2013.01)

(58) Field of Classification Search
CPC .. B60R 2021/343; B60R 21/34; B60R 13/07; B60R 13/04; B60R 13/06; B60R 13/0815; B60R 13/0838; B60R 21/38; B60H 1/28; B60H 2001/00085; B60H 1/00021; B60H 1/00535; B60H 1/00835; B62J 17/02; B62J 17/00; B62J 17/04; B62J 6/02; B62J 23/00; B62J 25/00; B62J 29/00; B62J 3/00

USPC .............. 296/192, 96.21, 187.09, 208, 203.2, 296/180.1, 187.04, 193.11, 201; 180/219, 180/229, 68.4; 29/897.2, 428

See application file for complete search history.

(56) References Cited

U.S. PATENT DOCUMENTS

| | | | | |
|---|---|---|---|---|
| 5,061,009 | A * | 10/1991 | Harasaki et al. .............. | 296/192 |
| 5,244,248 | A * | 9/1993 | Bovellan .................. | 296/187.09 |
| 7,988,224 | B2 * | 8/2011 | Desai ............................. | 296/192 |
| 8,602,487 | B2 * | 12/2013 | Tanaka et al. ................. | 296/192 |
| 2005/0269838 | A1 * | 12/2005 | Sohmshetty et al. ..... | 296/203.02 |
| 2011/0148148 | A1 * | 6/2011 | Desai ............................. | 296/192 |
| 2013/0134736 | A1 * | 5/2013 | Kuwabara et al. ............. | 296/72 |

FOREIGN PATENT DOCUMENTS

| | | |
|---|---|---|
| JP | 62-6872 A | 1/1987 |
| JP | 10-287272 A | 10/1998 |

\* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A connection structure may include at least one of left/right front pillars and a cowl, wherein the cowl may include a lower cowl having a body plate extended in a width direction of the vehicle and defining a lower portion of the cowl and a first flange, and an upper cowl covering an upper portion of the lower cowl, wherein the front pillar includes an inner front pillar forming an inner side portion of the front pillar in the width direction of the vehicle, and an outer front pillar forming an outer side portion of the front pillar in the width direction of the vehicle, and wherein the lower cowl is fixedly coupled to the front pillar by at least one inner side surface of the body plate and the first flange contacting an outer side surface of the inner front pillar.

6 Claims, 5 Drawing Sheets

SECTION A-A'

SECTION B-B'

SECTION D-D'

CONNECTION STRUCTURE OF COWL AND FRONT PILLAR

CROSS-REFERENCE TO RELATED APPLICATION

The present application claims priority of Korean Patent Application Number 10-2014-0044422 filed on Apr. 14, 2014, the entire contents of which are incorporated herein for all purposes by this reference.

BACKGROUND OF INVENTION

1. Field of Invention

The present invention relates to a connection structure of a cowl and a front pillar, and more particularly, to a connection structure of a cowl and a front pillar increasing structural robustness of the connection by applying an insertion type of flanges thereto.

2. Description of Related Art

In general, a dash panel and a cowl of a body in white (BIW) play a role of widthwise members connecting left/right front pillars in an aspect of structural robustness Particularly, a cowl is disposed at an upper portion of a dash panel, has a cross section perpendicular to a width direction of a vehicle, and is an important connecting member directly connecting left/right front pillars.

Generally, a cowl is formed by welding an upper cowl and a lower cowl.

FIG. 1 is a drawing showing a prior connection structure of a cowl and a front pillar, a cross section A-A', and a cross section B-B'.

Referring to a cross section A-A' of FIG. 1, a prior cowl is coupled to an inner front pillar 10a by welding H faces of an inner side surface of the inner front pillar 10a and an outer side surface of an upper cowl 20b and welding L faces of the inner side surface of the inner front pillar 10a and an outer side surface of a lower cowl 20a.

An H face and an L face stand for faces forming an angle of about 90 degrees respectively with a height direction of a vehicle and a width direction of the vehicle. T stands for a length direction of the vehicle, L a width direction, and H height direction throughout the drawings herein.

Referring to a cross section B-B' of FIG. 1, a cowl may have a cross section perpendicular to a length direction thereof including a straight line and two side lines, one ends of the two side lines being connected respectively to both ends of the straight line and an opposite side of the straight line being open.

In the meantime, under this kind of a connection structure has there been a problem that in case a crash of a side of a front portion of a vehicle happens, a front pillar and a cowl can't maintain enough rigidity to a behavior of their separating from each other and a connection portion of the front pillar and the cowl separates.

This problem was a critical drawback of weakening deliverability and absorbability for crash load by breaking a crash load path continuing to the front pillar on account of the separation.

It can be concluded that the result is from depending on only a welding rigidity without an improvement of structural robustness of the connection.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a connection structure of a cowl and a front pillar increasing structural robustness of the connection.

In various aspects of the present invention, a connection structure of a vehicle may include at least one of left/right front pillars and a cowl, wherein each of the front pillars is a reinforcing member of a side portion of a front portion of a vehicle and is extended from a lower side portion of the vehicle in a height direction of the vehicle and the cowl is disposed at an upper portion of a dash panel of the vehicle and connects the left/right front pillars, wherein the cowl may include a lower cowl including a body plate extended in a width direction of the vehicle to form opposite both ends and defining a lower portion of the cowl and a first flange formed at at least one of the both ends of the body plate in a downward direction, and an upper cowl extended in the width direction of the vehicle and covering an upper portion of the lower cowl such that a cross section of the cowl, perpendicular to the width direction of the vehicle, may include a straight line and two side lines, one ends of the two side lines being connected respectively to both ends of the straight line and an opposite side of the straight line being open, wherein the front pillar may include an inner front pillar forming an inner side portion of the front pillar in the width direction of the vehicle, and an outer front pillar forming an outer side portion of the front pillar in the width direction of the vehicle, and wherein the lower cowl is fixedly coupled to the front pillar by at least one inner side surface of the body plate and the first flange contacting an outer side surface of the inner front pillar.

The inner front pillar may include an extended portion in a length direction of the vehicle towards a front of the vehicle, and the upper cowl further may include a second flange formed at at least one of both ends thereof in the width direction of the vehicle in a downward direction, and is fixedly coupled to the front pillar by an inner side surface of the second flange contacting an outer side surface of the extended portion.

The front pillar further may include a cover portion, wherein the cover portion reinforces the coupling of the upper cowl and the extended portion of the inner front pillar by an inner side surface of the cover portion contacting and being coupled to outer side surfaces of the upper cowl and the extended portion.

The fixed coupling is achieved by welding.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
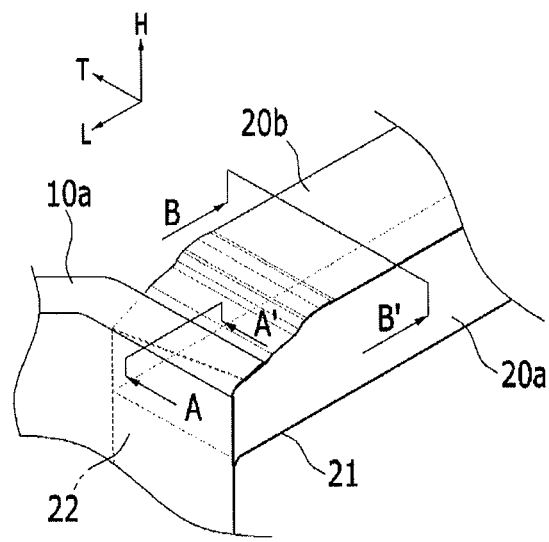
FIG. 1 is a drawing showing a prior connection structure of a cowl and a front pillar, a cross section A-A', and a cross section B-B'.
Figure 1:
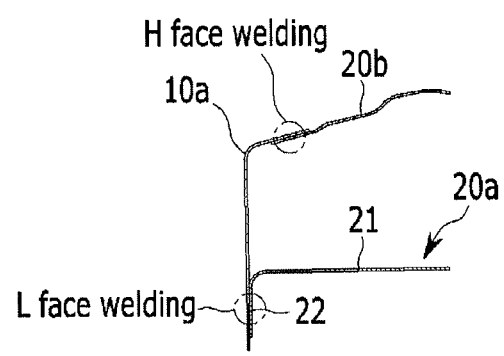
Figure 1:
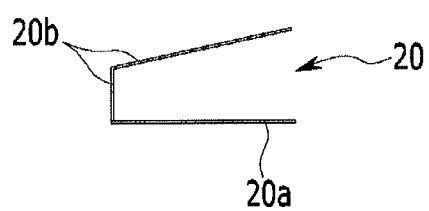

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 2:
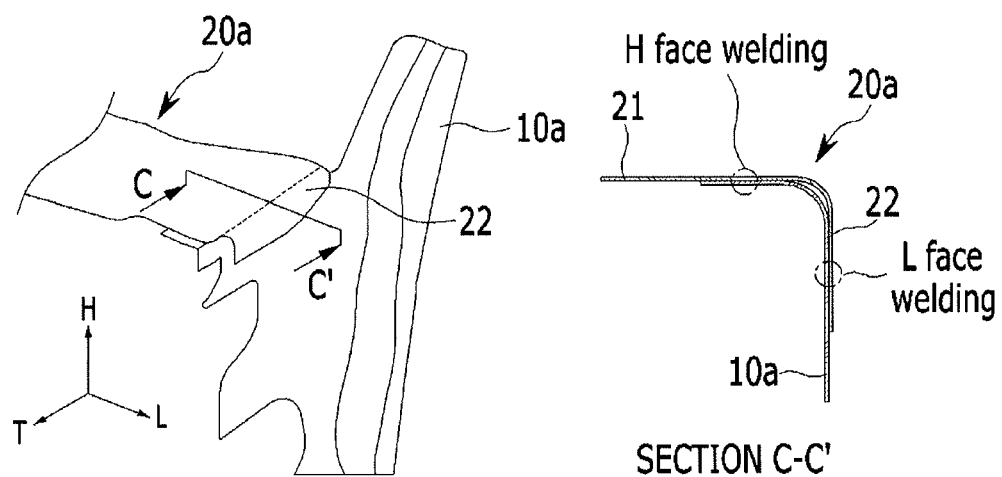
FIG. 2 is a drawing showing an exemplary connection structure of a cowl and a front pillar according to an exemplary embodiment of the present invention and a cross section C-C'.

FIG. 2 is a drawing showing an exemplary connection structure of a cowl and a front pillar according to an exemplary embodiment of the present invention and a cross section C-C'.

T stands for a length direction of the vehicle, L a width direction, and H height direction in the drawing.

Figure 3:
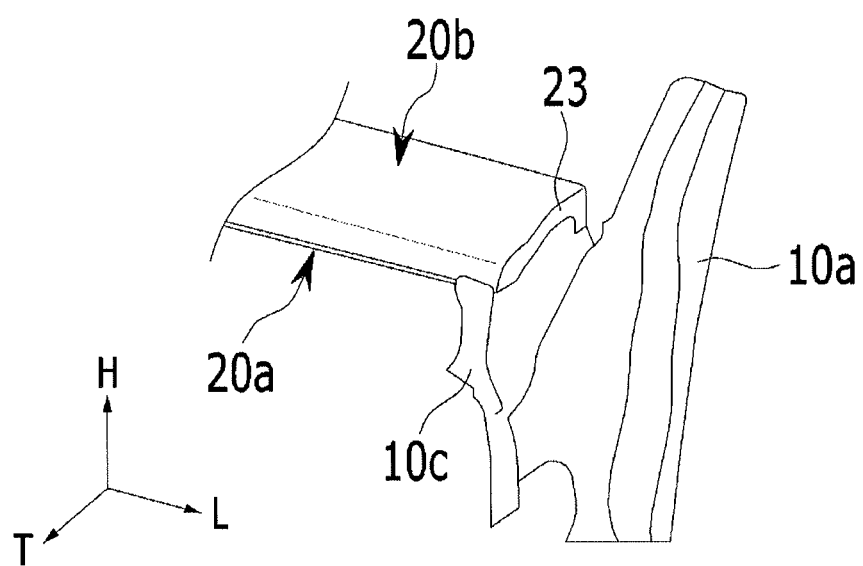
FIG. 3 is a drawing showing an exemplary connection structure of an upper cowl and an extended portion of an inner front pillar according to an exemplary embodiment of the present invention.

In an exemplary connection structure of a cowl 20 and a front pillar according to an exemplary embodiment of the present invention, the cowl 20 may include a lower cowl 20a and an upper cowl 20b (refer to FIG. 3).

In addition, the front pillar may include an inner front pillar 10a forming an inner side portion of the front pillar in a width direction of a vehicle and an outer front pillar forming an outer side portion of the front pillar in the width direction of the vehicle.

Referring to a perspective view in FIG. 2, the lower cowl 20a may include a body plate 21 extended in an L direction to form opposite both ends and defining a lower portion of the cowl 20 and a first flange 22 formed at at least one of the both ends of the body plate 21 in a downward direction.

Referring to a cross section C-C' in FIG. 2, an exemplary lower cowl 20a according to an exemplary embodiment of the present invention is coupled to the inner front pillar 10a by an inner side surface of the body plate 21 and the first flange 22 contacting an outer side surface of the inner front pillar 10a.

Here, the inner side surface is a face towards an inside of the vehicle and the outer side surface is a face towards an outside of the vehicle.

However, exemplary embodiments are not limited to the case above, at least one inner side surface of the body plate 21 and the first flange 22 may contact the outer side surface of the inner front pillar 10a, and thereby the lower cowl may be coupled to the inner front pillar 10a.

By this, compared with a prior connection structure in which an outer side surface of a lower cowl 20a contacts an inner side surface of an inner front pillar 10a, the present invention has an effect of improving robustness of the connection structurally.

This is because the connection is maintained not only by a welding rigidity but the first flange 22 can structurally limit movements of the front pillar in the L direction.

FIG. 3 is a drawing showing an exemplary connection structure of an upper cowl and an extended portion of an inner front pillar according to an exemplary embodiment of the present invention.

The inner front pillar 10a may further include an extended portion 10c in a T direction towards a front of the vehicle.

The extended portion 10c is a portion disposed at a front of the inner front pillar 10a in the T direction and may be formed by attaching an additional plate type member or formed integrally in a predetermined shape.

The inner front pillar 10a has also an effect of being extended in an H direction by the extended portion 10c, and thereby an outer side surface of the extended portion 10c may contact an inner side surface of an upper cowl 20b.

The upper cowl 20b may further include a second flange 23 formed at at least one of both ends thereof in an L direction of a vehicle in a downward direction.

When the outer side surface of the extended portion 10c contacts and is coupled to the inner side surface of the upper cowl 20b, the contact portion may be the second flange 23.

Accordingly, the second flange 23 of the cowl 20 can structurally limit movements of the front pillar in the L direction through coupling to the extended portion 10c as the first flange 22 of the cowl 20 does in FIG. 2.

Figure 5:
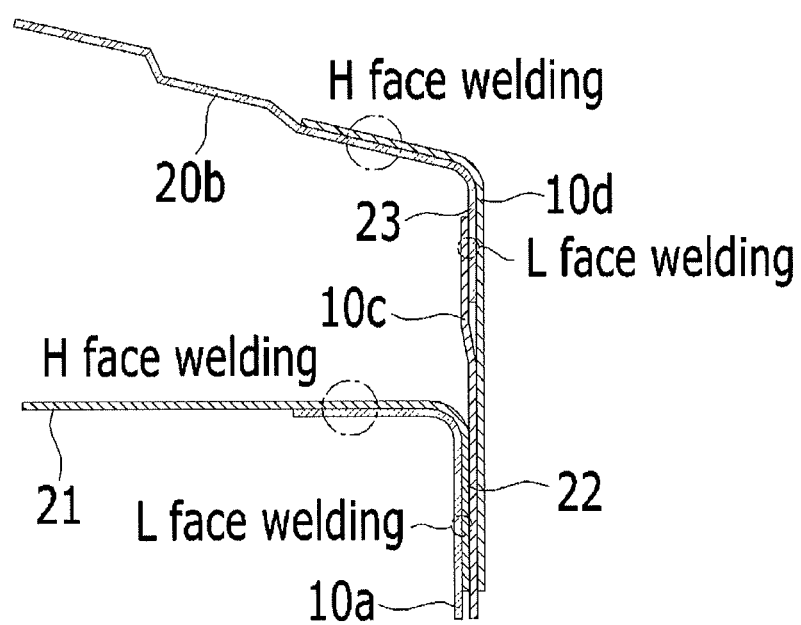
FIG. 5 is a drawing showing a cross section D-D' of FIG. 4.

This kind of structural similarity is well shown in a cross section D-D' of FIG. 5.

Figure 4:
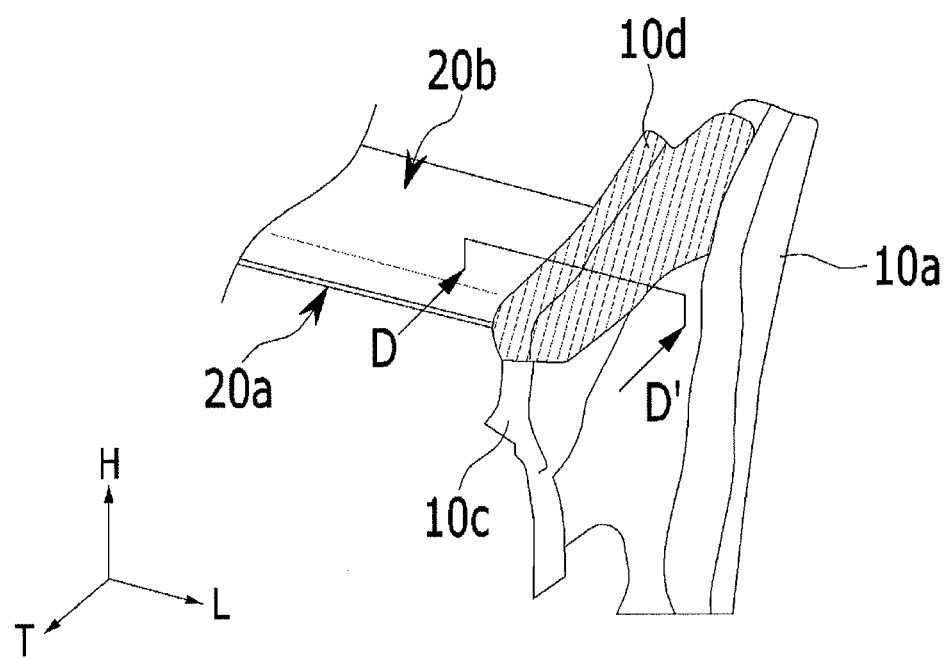
FIG. 4 is a drawing showing an exemplary connection structure of an upper cowl, an extended portion of an inner front pillar, and a cover portion of a front pillar according to an exemplary embodiment of the present invention.

FIG. 4 is a drawing showing an exemplary connection structure of an upper cowl, an extended portion of an inner front pillar, and a cover portion of a front pillar according to an exemplary embodiment of the present invention.

Referring to FIG. 4, the front pillar may further include a cover portion 10d.

An inner side surface of the cover portion 10d contacts an outer side surface of the upper cowl 20b and the extended portion 10c of the inner front pillar and then the cover portion 10d may become fixedly coupled to the front pillar 10.

Coupling of the upper cowl 20b and the extended portion 10c is more reinforced through the fixed coupling above.

By this, robustness of a connection structure of a cowl 20 and a front pillar is increased structurally.

FIG. 5 is a drawing showing a cross section D-D' of FIG. 4.

Referring to FIG. 5, exemplary connection structures of a cowl 20 and a front pillar according to an exemplary embodiment of the present invention can enhance the robustness thereof on account of movements of the front pillar in the L direction being limited by a first flange 22 whose inner side surface is coupled to an outer side surface of the inner front pillar 10a and a second flange 23 whose inner side surface is coupled to an outer side surface of the extended portion 10c of the inner front pillar.

Referring to FIG. 5, the exemplary connection structure of a cowl 20 and a front pillar according to an exemplary embodiment of the present invention may be connected by welding two H faces and two L faces unlike a prior art.

In addition, it's different from a prior art for the first and second flanges, 22 and 23 to contact outer side surfaces of the inner front pillar 10a and the extended portion 10c respectively.

By the two differences above, the robustness of the connection structure is improved structurally according to an exemplary embodiment of the present invention.

As shown in FIG. 5, the first flange 22 and the second flange 23 have both outer and inner side surfaces surrounded structurally by members of the front pillar 10, so they can be termed an insertion type of flanges.

That is, the connection structure may form a shape in which the first flange 22 is inserted between the inner front pillar 10a and the extended portion 10c of the inner front pillar and the second flange 23 is inserted between the extended portion 10c of the inner front pillar and the front pillar cover portion 10d.

The fixed couplings according to an exemplary embodiment of the present invention may be achieved by welding.

As explained in detail, without drastic changes of a prior design the structural robustness of connection of a cowl and an inner front pillar is increased, so the cowl and the front pillar are prevented from separating from each other in a small overlap crash, and thereby crash worthiness and safety of passengers are improved according to an exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connection structure of a vehicle, the connection structure comprising at least one of left/right front pillars and a cowl,
   wherein each of the front pillars is a reinforcing member of a side portion of a front portion of the vehicle and is extended from a lower side portion of the vehicle in a height direction of the vehicle and the cowl is disposed at an upper portion of a dash panel of the vehicle and connects the left/right front pillars,
   wherein the cowl includes:
      a lower cowl including:
         a body plate horizontally extending in a width direction of the vehicle to form opposite both ends of the vehicle and defining a lower portion of the cowl; and
         a first flange positioned at at least one end of both distal ends of the body plate and extending from the at least one end of the body plate in a downward direction of the body plate; and
      an upper cowl extended in the width direction of the vehicle and covering an upper portion of the lower cowl such that a cross section of the cowl, perpendicular to the width direction of the vehicle, includes a straight line and two side lines, one ends of the two side lines being connected respectively to both ends of the straight line and an opposite side of the straight line being open,
   wherein the front pillar includes:
      an inner front pillar forming an inner side portion of the front pillar in the width direction of the vehicle; and
      an outer front pillar forming an outer side portion of the front pillar in the width direction of the vehicle, and
   wherein the lower cowl is fixedly coupled to the front pillar by at least one inner side surface of the body plate and the first flange contacting an outer side surface of the inner front pillar.

2. The connection structure of the at least one of left/right front pillars and the cowl of claim 1,
   wherein the inner front pillar includes an extended portion in a length direction of the vehicle towards a front of the vehicle, and
   wherein the upper cowl further includes a second flange formed at at least one of both ends thereof in the width direction of the vehicle in a downward direction, and is fixedly coupled to the front pillar by an inner side surface of the second flange contacting an outer side surface of the extended portion.

3. The connection structure of the at least one of left/right front pillars and the cowl of claim 2,
   wherein the front pillar further includes a cover portion, and
   wherein the cover portion reinforces the coupling of the upper cowl and the extended portion of the inner front pillar by an inner side surface of the cover portion contacting and being coupled to outer side surfaces of the upper cowl and the extended portion.

4. The connection structure of the at least one of left/right front pillars and the cowl of claim 1, wherein the fixed coupling is achieved by welding.

5. The connection structure of the at least one of left/right front pillars and the cowl of claim 2, wherein the fixed couplings are achieved by welding.

6. The connection structure of the at least one of left/right front pillars and the cowl of claim 3, wherein the fixed couplings are achieved by welding.

* * * * *